US006953247B1

(12) United States Patent
Duffy et al.

(10) Patent No.: US 6,953,247 B1
(45) Date of Patent: Oct. 11, 2005

(54) DIVE MASK SYSTEM

(76) Inventors: Charles J. Duffy, 7695 14th Ave. North, St. Petersburg, FL (US) 33709-1757; J. Scott Payne, 8476 Meadow Brook Dr., Largo, FL (US) 33777

( * ) Notice: Subject to any disclaimer, the term of this patent is extended or adjusted under 35 U.S.C. 154(b) by 39 days.

(21) Appl. No.: 10/678,844

(22) Filed: Oct. 3, 2003

(51) Int. Cl.[7] .............................................. G02C 1/00
(52) U.S. Cl. .......................................... 351/43; 2/426
(58) Field of Search ........... 351/41, 43, 44; 2/426–435

(56) References Cited

U.S. PATENT DOCUMENTS

| | | | | |
|---|---|---|---|---|
| 5,363,151 A | * | 11/1994 | Biays et al. ................... 351/43 |
| 5,572,989 A | * | 11/1996 | Lutz et al. ............. 128/201.18 |
| 5,638,552 A | * | 6/1997 | Fujima ........................... 2/428 |
| 5,940,231 A | * | 8/1999 | Westhaver ................... 359/885 |
| 6,092,895 A | * | 7/2000 | Sato et al. .................... 351/43 |

* cited by examiner

Primary Examiner—Huy Mai
(74) Attorney, Agent, or Firm—Edward P. Dutkiewicz

(57) ABSTRACT

A mask assembly has two circumferential frames with an interior edge, an exterior edge and a lens. The assembly includes a skirt with a forward edge coupled to the frames. The forward edge extends rearwardly and terminates at a periphery positionable on the face of a wearer. A strap assembly includes a strap that is positionable around the head of a wearer. Free ends are secured to the vertical areas. The free ends of the strap are for securement and adjustment. A shield assembly has a front area that is positionable in front of the frames and lenses. The assembly has a peripheral ledge. An upper projection that extends from the shield. A finger extends adjacent to the horizontal area of the frame. Projections extend from the shield. Each has a finger extending upwardly. The projections and fingers are adapted to releasably couple the shield assembly to the mask assembly.

3 Claims, 3 Drawing Sheets

DIVE MASK SYSTEM

BACKGROUND OF THE INVENTION

1. Field of the Invention

The present invention relates to a dive mask with optical filter system and more particularly pertains to maximizing a diver's visibility as a function of the environment.

2. Description of the Prior Art

The use of diving equipment of known designs and configurations is known in the prior art. More specifically, diving equipment of known designs and configurations previously devised and utilized for the purpose of improving vision through water through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,033,818 issued Jul. 23, 1991 to Barr relates to an electronic diving system and face mask display. U.S. Pat. No. 5,363,151 issued Nov. 8, 1994 to Biays relates to color correction for improved vision through water and other environments. Lastly, U.S. Pat. No. 5,572,989 issued Nov. 12, 1996 to Lutz relates to a pressure equalizing mechanism for a diving mask.

While these devices fulfill their respective, particular objectives and requirements, the aforementioned patents do not describe a dive mask with optical filter system that allows maximizing a diver's visibility as a function of the environment.

In this respect, the dive mask with optical filter system according to the present invention substantially departs from the conventional concepts and designs of the prior art, and in doing so provides an apparatus primarily developed for the purpose of maximizing a diver's visibility as a function of the environment.

Therefore, it can be appreciated that there exists a continuing need for a new and improved dive mask with optical filter system which can be used for maximizing a diver's visibility as a function of the environment. In this regard, the present invention substantially fulfills this need.

SUMMARY OF THE INVENTION

In view of the foregoing disadvantages inherent in the known types of diving equipment of known designs and configurations now present in the prior art, the present invention provides an improved dive mask with optical filter system. As such, the general purpose of the present invention, which will be described subsequently in greater detail, is to provide a new and improved dive mask with optical filter system and method which has all the advantages of the prior art and none of the disadvantages.

To attain this, the present invention essentially comprises a mask assembly. The mask has two laterally spaced rigid circumferential frames. Each frame has an interior edge and an exterior edge. The exterior edge has an upper horizontal area, two lower horizontal areas and two laterally spaced vertical areas. The mask assembly also includes a clear primary lens. The primary lens is supported by each of the frames in front of a wearer's eyes. The mask assembly also includes a skirt. The skirt is fabricated of a flexible elastomeric material, such as plastic or rubber, natural or synthetic, or blends thereof. The skirt has a forward edge. The forward edge is coupled to the frames. The forward edge extends rearwardly. The forward edge terminates at a periphery. The forward edge is positionable on the face of a wearer to encompass the area above the eyes, above the mouth and exteriorly of the eyes and nose.

A strap assembly is provided next. The strap assembly includes a strap. The strap is made of flexible elastomeric material, such as plastic or rubber, natural or synthetic, or blends thereof. The strap assembly is positionable around the back of the head of a wearer. The strap assembly has free ends. The free ends are positionable adjacent to the temples of a wearer. The strap assembly also includes support pieces. The support pieces are secured to the vertical areas of the frames with vertical posts. The vertical posts receive the free ends of the strap for securement and adjustment purposes. The free ends of the strap has loop-like keepers.

Further provided is a shield assembly. The shield assembly is fabricated of a transparent elastomeric material, such as plastic or rubber, natural or synthetic, or blends thereof. The transparent elastomeric material has limited flexibility. The material is a color selected from magenta and yellow. The shield assembly has a planar front area. The planar front area is positionable in front of the frames and lenses. The shield assembly has a rearwardly extending peripheral ledge. The peripheral ledge is positionable adjacent to the upper and lower horizontal areas. The peripheral ledge is laterally spaced to the vertical areas of the frames. The shield assembly also includes an upper projection. The upper projection extends rearwardly from the shield with a finger extending downwardly adjacent to the upper horizontal area of the frame. Two lower projections extend rearwardly from the shield. Each projection has a finger. The finger extends upwardly adjacent to the lower horizontal area of the frame. The projections and fingers are adapted to releasably couple the shield assembly to the mask assembly. A large rectangular aperture is provided in the planar front area of the shield assembly adjacent to the upper projection. A small rectangular aperture is provided in the planar front area of the shield assembly adjacent to each lower first projection. The apertures function to facilitate the molding of the shield assembly as a unitary component.

Provided last is a plurality of inserts. The plurality of inserts includes one large insert. The large insert is positionable over the large aperture. The large insert has barbs. The barbs extend rearwardly from the large insert through the large aperture. The plurality of inserts also includes small inserts. The small inserts are positionable over the small apertures. The small inserts have barbs. The barbs extend rearwardly from the small inserts through the large aperture. The inserts are adapted to preclude the leakage of water to interior of the mask during use of the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dive mask with optical filter system which has all of the advantages of the prior art diving equipment of known designs and configurations and none of the disadvantages.

It is another object of the present invention to provide a new and improved dive mask with optical filter system which may be easily and efficiently manufactured and marketed.

It is further an object of the present invention to provide a new and improved dive mask with optical filter system which is of durable and reliable constructions.

An even further object of the present invention is to provide a new and improved dive mask with optical filter system which is susceptible of a low cost of manufacture with regard to both materials and labor, and which accordingly is then susceptible of low prices of sale to the consuming public, thereby making such dive mask with optical filter system economically available to the buying public.

Even still another object of the present invention is to provide a dive mask with optical filter system for maximizing a diver's visibility as a function of the environment.

Lastly, it is an object of the present invention to provide a new and improved dive mask with optical filters system. A mask assembly has two circumferential frames with an interior edge, an exterior edge and a lens. The assembly includes a skirt with a forward edge coupled to the frames. The forward edge extends rearwardly and terminates at a periphery positionable on the face of a wearer. A strap assembly includes a strap that is positionable around the head of a wearer. Free ends are secured to the vertical areas. The free ends of the strap are for securement and adjustment. A shield assembly has a front area that is positionable in front of the frames and lenses. The assembly has a peripheral ledge. An upper projection that extends from the shield. A finger extends adjacent to the horizontal area of the frame. Projections extend from the shield. Each has a finger extending upwardly. The projections and fingers are adapted to releasably couple the shield assembly to the mask assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
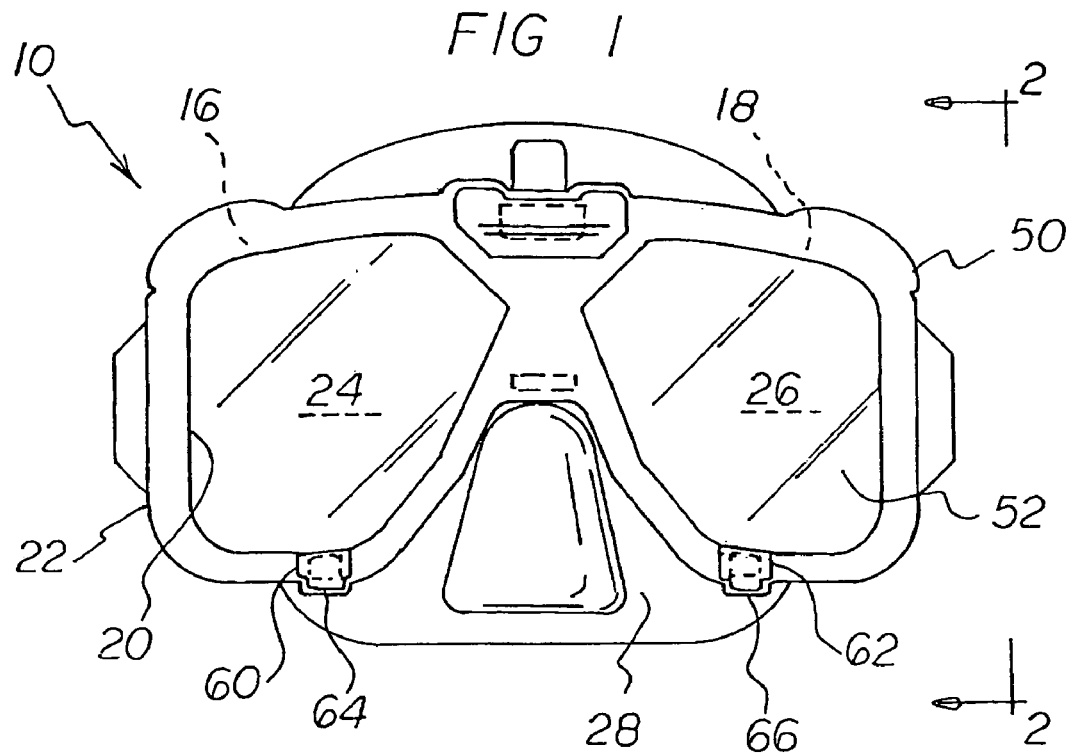
FIG. 1 is a front elevational view of a dive mask with optical filters system constructed in accordance with the principles of the present invention.
Figure 2:
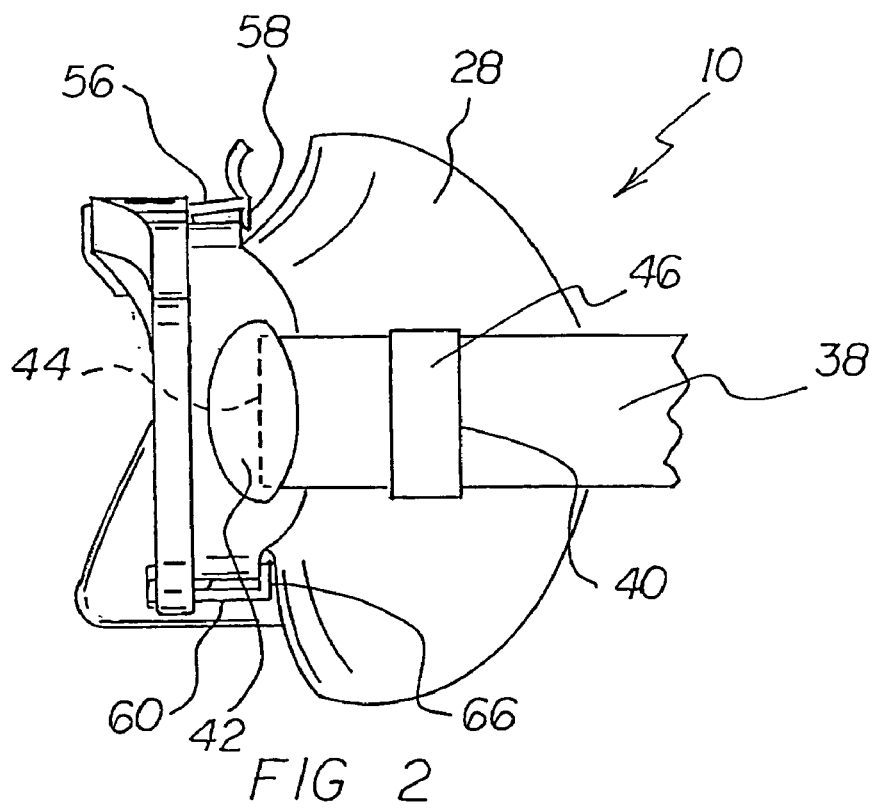
FIG. 2 is a side elevational view of the system shown in FIG. 1 taken along line 2—2 of FIG. 1.
Figure 3:
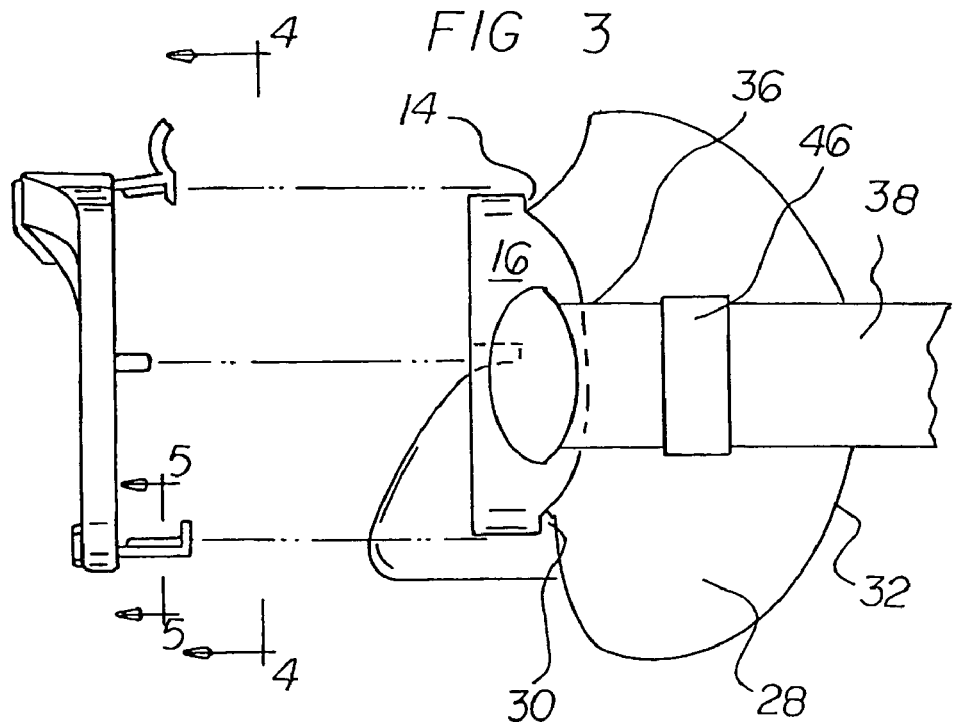
FIG. 3 is an exploded side elevational view of the system shown in FIGS. 1 and 2.
Figure 4:
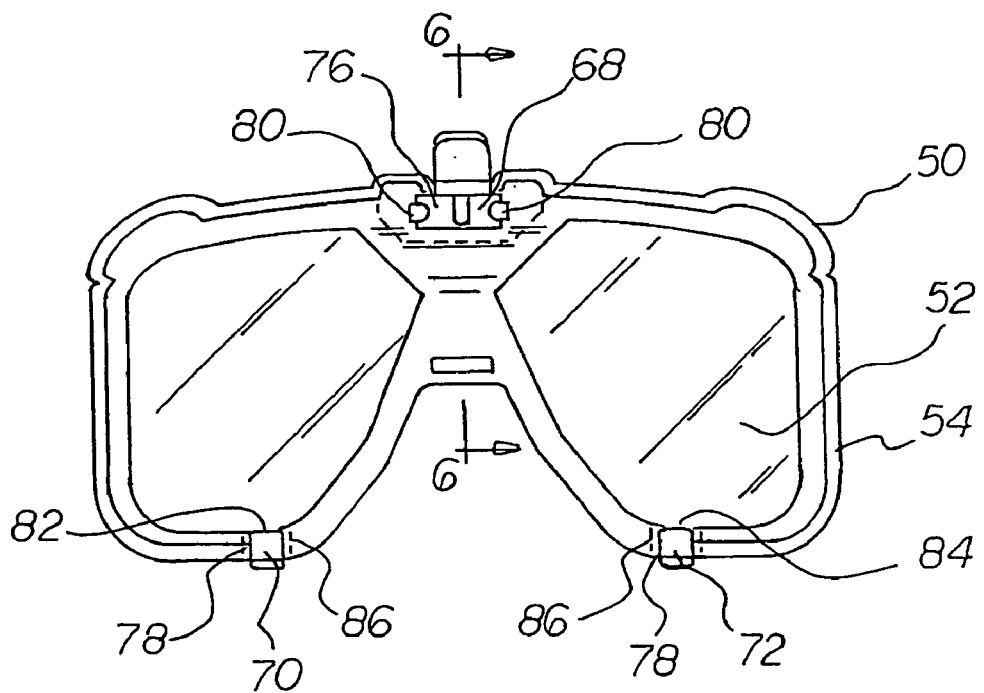
FIG. 4 is a front elevational view of the filter of the system taken along line 4—4 of FIG. 3.
Figure 5:
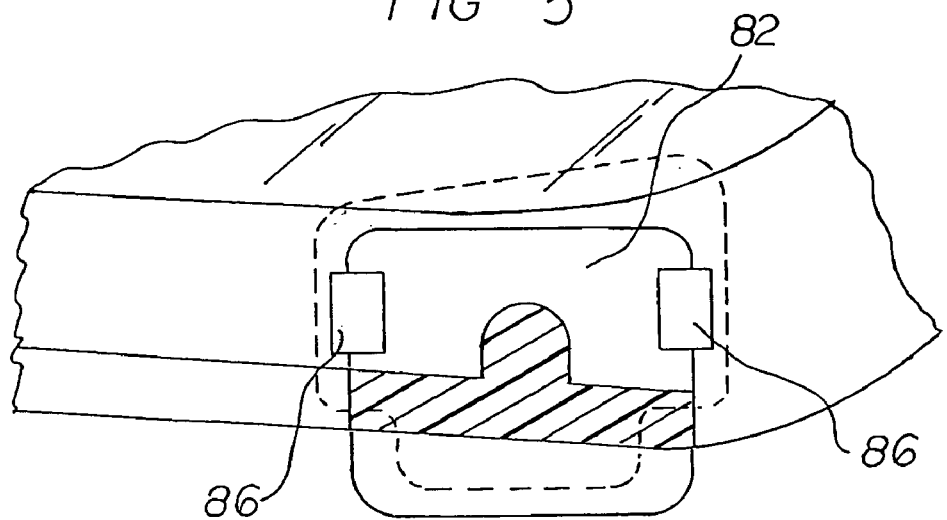
FIG. 5 is a cross sectional view of a portion of the filter taken along line 5—5 of FIG. 3.
Figure 6:
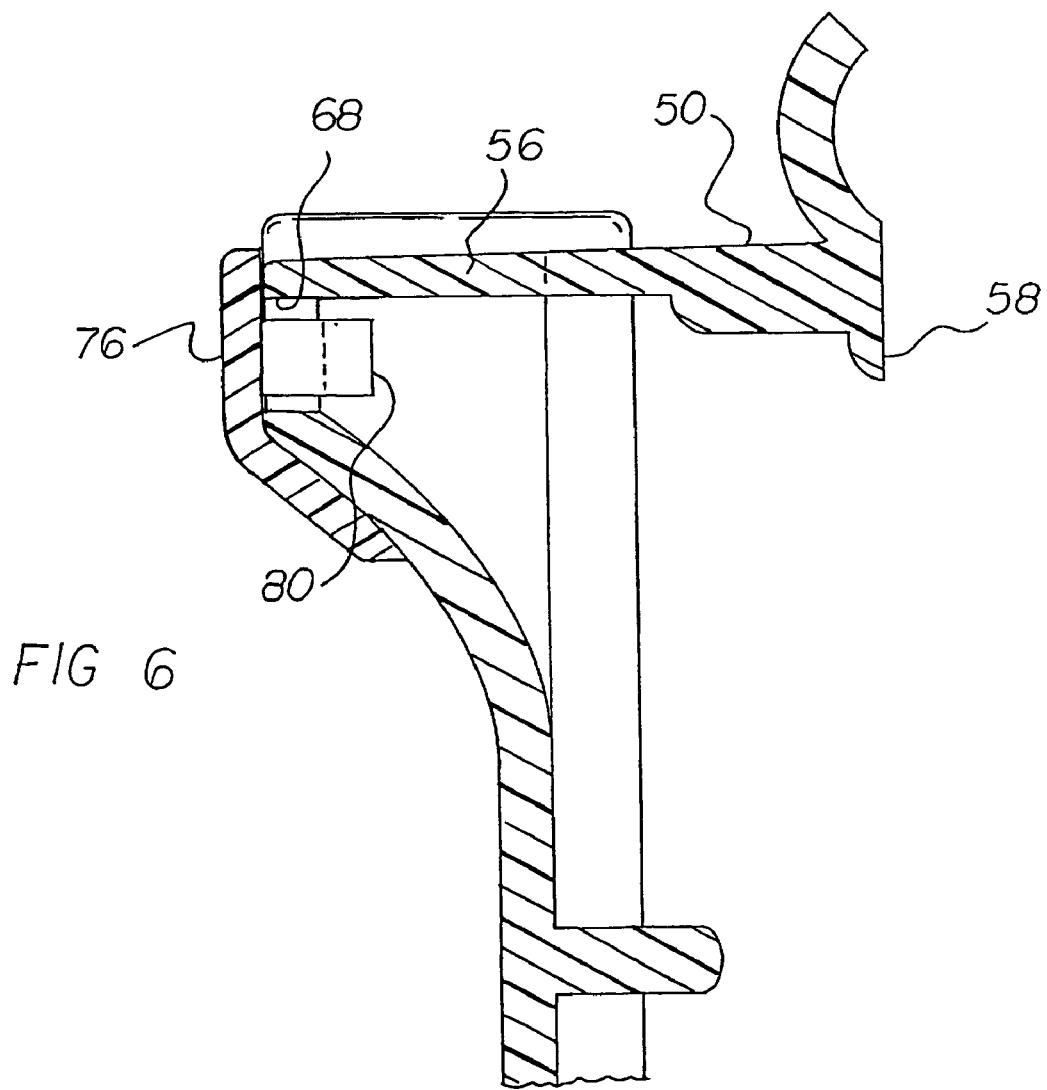
FIG. 6 is a cross sectional view of a portion of the system taken along line 6—6 of FIG. 4.

With reference now to the drawings, and in particular to FIG. 1 thereof, the preferred embodiment of the new and improved dive mask with optical filter system embodying the principles and concepts of the present invention and generally designated by the reference numeral 10 will be described.

The present invention, the dive mask with optical filter system 10 is comprised of a plurality of components. Such components in their broadest context include a mask assembly, a strap assembly, and a shield assembly. Such components are individually configured and correlated with respect to each other so as to attain the desired objective.

First provided is a mask assembly 14. The mask has two laterally spaced rigid circumferential frames 16, 18. Each frame has an interior edge 20 and an exterior edge 22. The exterior edge has an upper horizontal area, two lower horizontal areas and two laterally spaced vertical areas. The mask assembly also includes a clear primary lens 24, 26. The primary lens is supported by each of the frames in front of a wearer's eyes. The mask assembly also includes a skirt 28. The skirt is fabricated of a flexible elastomeric material, such as plastic or rubber, natural or synthetic, or blends thereof. The skirt has a forward edge 30. The forward edge is coupled to the frames. The forward edge extends rearwardly. The forward edge terminates at a periphery 32. The forward edge is positionable on the face of a wearer to encompass the area above the eyes, above the mouth and exteriorly of the eyes and nose.

A strap assembly 36 is provided next. The strap assembly includes a strap 38. The strap is made of flexible elastomeric material, such as plastic or rubber, natural or synthetic, or blends thereof. The strap assembly is positionable around the back of the head of a wearer. The strap assembly has free ends 40. The free ends are positionable adjacent to the temples of a wearer. The strap assembly also includes support pieces 42. The support pieces are secured to the vertical areas of the frames with vertical posts 44. The vertical posts receive the free ends of the strap for securement and adjustment purposes. The free ends of the strap has loop-like keepers 46.

Further provided is a shield assembly 50. The shield assembly is fabricated of a transparent elastomeric material, such as plastic or rubber, natural or synthetic, or blends thereof. The transparent elastomeric material has limited flexibility. The material is a color selected from magenta and yellow. The shield assembly has a planar front area 52. The planar front area is positionable in front of the frames and lenses. The shield assembly has a rearwardly extending peripheral ledge 54. The peripheral ledge is positionable adjacent to the upper and lower horizontal areas. The peripheral ledge is laterally spaced to the vertical areas of the frames. The shield assembly also includes an upper projection 56. The upper projection extends rearwardly from the shield with a finger 58 extending downwardly adjacent to the upper horizontal area of the frame. Two lower projections 60, 62 extend rearwardly from the shield. Each projection has a finger 64, 66. The finger extends upwardly adjacent to the lower horizontal area of the frame. The projections and fingers are adapted to releasably couple the shield assembly to the mask assembly. A large rectangular aperture 68 is provided in the planar front area of the shield assembly adjacent to the upper projection. A small rectangular aperture 70, 72 is provided in the planar front area of the shield assembly adjacent to each lower first projection. The apertures function to facilitate the molding of the shield assembly as a unitary component.

Provided last is a plurality of inserts 76, 78. The plurality of inserts includes one large insert 76. The large insert is positionable over the large aperture. The large insert has barbs 80. The barbs extend rearwardly from the large insert through the large aperture. The plurality of inserts also includes small inserts 82, 84. The small inserts are positionable over the small apertures. The small inserts have barbs 86. The barbs extend rearwardly from the small inserts through the large aperture. The inserts are adapted to preclude the leakage of water to interior of the mask during use of the system.

The system of the present invention can change its colors depending on the environment.

The system delivers versatility for users through two uniquely designed mask shields.

The magenta color correcting filter shield is designed for use in warmer waters where colors are more rich and vibrant. By using the color correcting filters, users will have the opportunity to better experience the colors of the underwater world that are often lost at depth.

The yellow MaxVision tm filter shield is for use in low light situations. Technical divers, cave divers and those diving in turbid waters around the world will benefit from this shield which helps to optimize available light and help improve visibility at the same time.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dive mask system for maximizing a diver's visibility as a function of the environment comprising, in combination:

a mask assembly having two laterally spaced rigid circumferential frames, each frame having an interior edge and an exterior edge, the exterior edge having an upper horizontal area and two lower horizontal areas and two laterally spaced vertical areas, the mask assembly also including a clear primary lens supported by each of the frames in front of a wearer's eyes, the mask assembly also including a skirt fabricated of a flexible elastomeric material and having a forward edge coupled to the frames and extending rearwardly extending to terminate at a periphery positionable on the face of a wearer to encompass the area above the eyes and above the mouth and exteriorly of the eyes and nose;

a strap assembly including a strap of flexible elastomeric material positionable around the back of the head of a wearer with free ends positionable adjacent to the temples of a wearer, the strap assembly also including support pieces secured to the vertical areas of the frames with vertical posts receiving there around the free ends of the strap for securement and adjustment purposes and with loop-like keepers for the free ends of the strap;

a shield assembly fabricated of a transparent elastomeric material having limited flexibility and being a color selected from the colors including magenta and yellow, the shield assembly having a planar front area positionable in front of the frames and lenses and a rearwardly extending peripheral ledge positionable adjacent to the upper and lower horizontal areas and laterally spaced vertical areas of the frames, the shield assembly also including an upper projection extending rearwardly from the shield with a finger extending downwardly adjacent to the upper horizontal area of the frame and with two lower projection extending rearwardly from the shield each with a finger extending upwardly adjacent to the lower horizontal area of the frame, the projections and fingers adapted to releasably couple the shield assembly to the mask assembly, a large rectangular aperture 68 in the planar front area of the shield assembly adjacent to the upper projection and a small rectangular aperture in the planar front area of the shield assembly adjacent to each lower first projection, the apertures functioning to facilitate the molding of the shield assembly as a unitary component;

a plurality of inserts including one large insert positionable over the large aperture with barbs extending rearwardly therefrom through the large aperture and two small inserts positionable over the small apertures with barbs extending rearwardly therefrom through the large aperture, the inserts adapted to preclude the leakage of water to interior of the mask during use of the system.

2. A dive mask system:

a mask assembly having two laterally spaced rigid circumferential frames each having an interior edge and an exterior edge and also including a clear primary lens supported by each of the frames, the mask assembly also including a skirt with a forward edge coupled to the frames and extending rearwardly extending to terminate at a periphery positionable on the face of a wearer;

a strap assembly including a strap positionable around the back of the head of a wearer with free ends with support pieces secured to the vertical areas receiving the free ends of the strap for securement and adjustment purposes;

a shield assembly fabricated of a transparent elastomeric material and having limited flexibility and being a color and having a planar front area positionable in front of the frames and lenses and a rearwardly extending peripheral ledge positionable adjacent to the upper and lower horizontal areas and laterally spaced vertical areas of the frames, the shield assembly also including an upper projection extending rearwardly from the shield with a finger extending downwardly adjacent to the upper horizontal area of the frame and with two lower projection extending rearwardly from the shield each with a finger extending upwardly adjacent to the lower horizontal area of the frame, the projections and fingers adapted to releasably couple the shield assembly to the mask assembly;

a large rectangular aperture in the planar front area of the shield assembly adjacent to the upper projection and a small rectangular aperture in the planar front area of the shield assembly adjacent to each lower first projection, the apertures functioning to facilitate the molding of the shield assembly as a unitary component; and a plurality of inserts including one large insert positionable over the large aperture with barbs extending rearwardly therefrom through the large aperture and two small inserts positionable over the small apertures with barbs extending rearwardly therefrom through the large aperture, the inserts adapted to preclude the leakage of water to interior of the mask during use of the system.

3. The system as set forth in claim 2 wherein the shield assembly is fabricated of a transparent elastomeric material having limited flexibility and being a color selected from the colors including magenta and yellow.

* * * * *